United States Patent
Le et al.

(10) Patent No.: US 12,463,556 B2
(45) Date of Patent: Nov. 4, 2025

(54) RECTIFIER CONTROL WITH ADAPTIVE TURN-OFF

(71) Applicant: Avago Technologies International Sales Pte. Limited, Singapore (SG)

(72) Inventors: Jim Le, Fort Collins, CO (US); John Walley, Ladera Ranch, CA (US); Marc Keppler, Windsor, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 652 days.

(21) Appl. No.: 17/872,341

(22) Filed: Jul. 25, 2022

(65) Prior Publication Data

US 2024/0030832 A1    Jan. 25, 2024

(51) Int. Cl.
*H02M 7/5387*  (2007.01)
*H02M 1/00*  (2006.01)
*H02M 1/088*  (2006.01)

(52) U.S. Cl.
CPC ..... *H02M 7/53873* (2013.01); *H02M 1/0009* (2021.05); *H02M 1/088* (2013.01)

(58) Field of Classification Search
CPC ......... H02M 7/53873; H02M 7/53878; H02M 7/5388; H02M 7/5387; H02M 7/53871; H02M 1/0009; H02M 1/0012; H02M 1/088; H02M 1/092; H02M 1/10
See application file for complete search history.

(56) References Cited

U.S. PATENT DOCUMENTS

2013/0235635 A1*  9/2013  Takahagi ............... H02J 7/02
                                                              363/127
2016/0349818 A1*  12/2016  Sonnaillon ........ H02M 7/53873

* cited by examiner

*Primary Examiner* — Nguyen Tran
(74) *Attorney, Agent, or Firm* — Quarles & Brady LLP (57) ABSTRACT

A rectifier includes digital timers to control FET switching rather than direct measurement of current and/or voltage. The digital timers control turn-off time to compensate for a delay produced by comparators in the rectifier. The digital timers are adjusted over multiple cycles to arrive at a turn-off time that produces zero current turn-off. The digital timers may be periodically or continuously readjusted based on a preceding set of cycles. Adaptive turn-off via digital timers is useful for discontinuous conduction mode suppression.

17 Claims, 11 Drawing Sheets

RECTIFIER CONTROL WITH ADAPTIVE TURN-OFF

BACKGROUND

Rectifiers in wireless power transfer systems utilize control circuitry to drive field effect transistors (FETs). The control circuitry operation inherently takes time, which causes delays in switching times (for example 20 to 30 nanoseconds) that worsen as the carrier frequency increases. These delays introduce various problems including rectifier instability, reverse currents, impedance modifications, and reduced efficiency. It is desirable to start the switching process early so that the FETs are switched at an appropriate time based on the input current and voltage.

Existing methods to control turn-off time involve monitoring the input of the rectifier and measuring the voltage and/or current. Based on the input waveforms, the rectifier can estimate the slope of the waveform and then predict waveform conditions to start the switching process early. Such predictive, derivative waveform measurement is computationally intensive and imprecise.

Alternatively, turn-off time may be controlled with a phase-locked loop that tracks the input current and voltage, and precisely predicts a phase shift to account for comparator delay. Phase-locked loop circuitry is complicated and expensive.

Finally, turn-off time may be controlled by adjusting analog comparator thresholds dynamically. When adjusting analog comparator thresholds, the resulting turn-off time control is sensitive to load variations.

It would be advantageous to have a mechanism for controlling rectifier FET turn-off time that is accurate, robust, reliable, and adaptive.

SUMMARY

In one aspect, embodiments of the inventive concepts disclosed herein are directed to a rectifier with digital timers to control FET switching. The digital timers control turn-off time to compensate for a delay produced by comparators in the rectifier.

In a further aspect, the digital timers are adjusted over multiple cycles to arrive at a turn-off time that produces zero current turn-off. The digital timers may be periodically or continuously readjusted based on a preceding set of cycles.

In a further aspect, FET turn-off controlled by digital timer may be used for discontinuous conduction mode suppression.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" is employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement.

Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a rectifier with digital timers to control field effect transistor (FET) switching. The digital timers control turn-off time to compensate for a delay produced by comparators in the rectifier. The digital timers may be adjusted over multiple cycles to arrive at a turn-off time that produces zero current turn-off, and may be periodically or continuously readjusted based on a preceding set of cycles. FET turn-off controlled by digital timer may be used for discontinuous conduction mode suppression.

Figure 1:
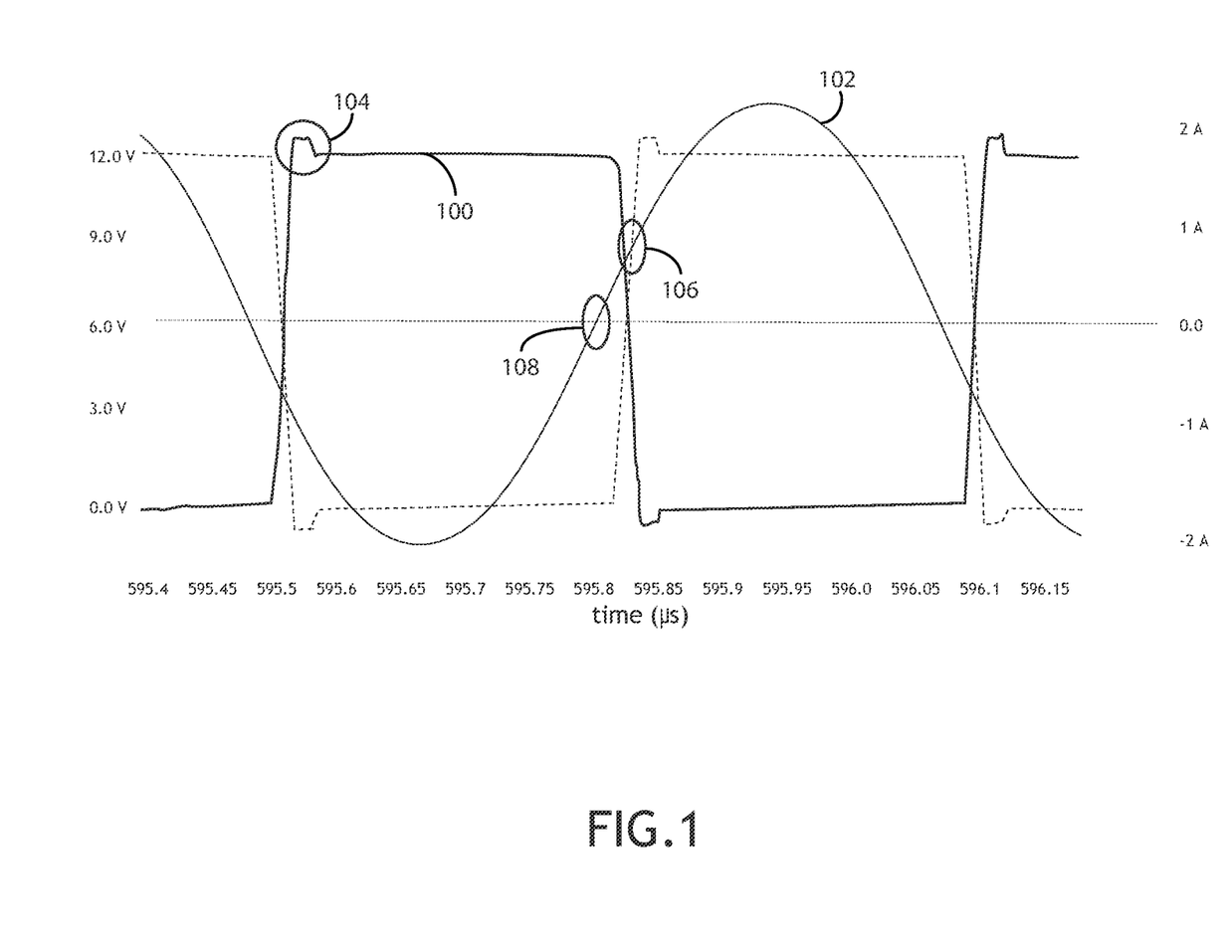
FIG. 1 shows a graph of rectifier signal waveforms according to an exemplary embodiment.

Referring to FIG. 1, a graph of rectifier signal waveforms is shown. A rectifier may be a device that is able to convert alternating current (AC) to direct current (DC) and may include, but is not limited to, e.g., single-phase rectifiers, three phase rectifiers, controlled rectifiers, uncontrolled rectifiers, half wave rectifiers, full wave rectifiers, bridge rectifiers, center-trapped rectifiers, and the like. AC waveform voltage 100 and current 102 are shown for one side of a rectifier; it may be appreciated that both sides a rectifier would operate similarly, and 180° out of phase with each other. Based on the AC waveform voltage 100 and current 102, one side of the rectifier (one set of FETs, for example) may be turned on 104 at a first time and turned off 106 at a second time. Before the rectifier turns on 104, the voltage 100 conducts through the body diode of the power FET, then the power FET turns on and brings the voltage 100 down. Current comparators may detect the current 102 direction in the rectifier. A current comparator may be, e.g., a differential amplifier, an operational amplifier, or the like. When the current 102 goes through the body diode, the comparators may detect it and turn on the corresponding FETs. Likewise, when the current 102 switches direction, the comparators may turn off those FETs to allow a coil to push the current 102 in the other direction. An FET is a type of transistor that uses an electric field to control the flow of current in a semiconductor. FETs may include, e.g., metal-oxide-semiconductor FETs (MOSFETs), junction FETs (JFETs), and the like.

Traditionally, each side of the rectifier may be turned off 106 after the current 102 actually switches direction 108 because of the time it takes for the current comparators to perform their function. The turn-off delay may manifest in higher currents in the coil, and therefore more heat in the system, and charge stored in an output capacitor being directed back to the coil (reverse currents), which may be detrimental to system efficiency and stability. Ideally the rectifier would function as a diode bridge where charge only moves unidirectionally from the coil to the output of the diode bridge.

At very high frequencies, there may be a small power loss due to switching events not occurring at exactly the correct moment in time or when turn-off current is very close to 0 mA. Even with factory trimming and calibration on delays, the proper switching time changes with load current ($V_{RECT}$) and coil network.

Figure 2:
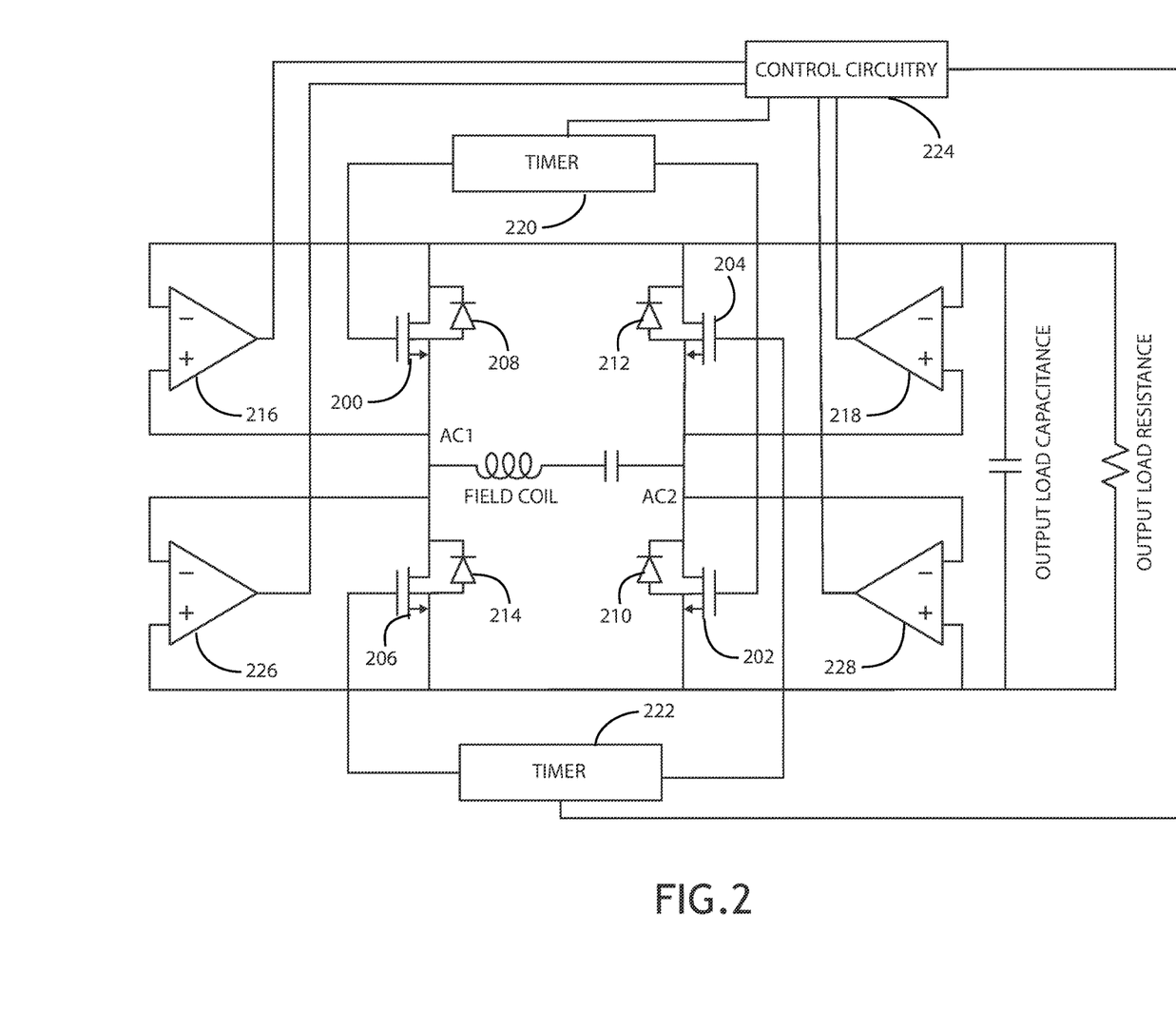
FIG. 2 shows a block diagram of a rectifier circuit according to an exemplary embodiment.

Referring to FIG. 2, a block diagram of a rectifier circuit according to an exemplary embodiment is shown. A rectifier may include four power FETs 200, 202, 204, 206 and corresponding body diodes 208, 210, 212, 214. When current is detected in a first body diode 208 via a first comparator 216, a first FET 200 and a second FET 202 may be turned on. At the point where current changes direction in the input waveform (zero current), the first FET 200 and the second FET 202 may be turned off by a second comparator 228. Meanwhile, a third comparator 218 detects current in a third body diode 212 corresponding to a third FET 204, and the third comparator 218 may turn on the third FET 204 and a fourth FET 206 (associated with a corresponding fourth comparator 226). The first FET 200 and second FET 202 correspond to one side of the rectifier while the third FET 204 and the fourth FET 206 correspond to the other side of the rectifier.

The rectifier may have three modes of operation: the side corresponding to the first FET 200 and the second FET 202 (a first diagonal) is on; the side corresponding to the third FET 204 and the fourth FET 206 (a second diagonal) is on; or all four FETs 200, 202, 204, 206 are off.

In at least one embodiment, timers 220, 222 may control when the FETs 200, 202, 204, 206 may be turned off. For example, when the first comparator 216 detects current in the first body diode 208, the first FET 200 and the second FET 202 may be turned on and a first timer 220 may begin running. When the first timer 220 reaches a predetermined value, the first FET 200 and the second FET 202 may be turned off, regardless of the state of the second comparator 228. Likewise, when the third comparator 218 detects current in the third body diode 212, the third FET 204 and the fourth FET 206 may be turned on and a second timer 222 may begin running. When the second timer 222 reaches a predetermined value, the third FET 204 and the fourth FET 206 may be turned off, regardless of the state of the fourth comparator 226. In the context of the present disclosure, it may be appreciated that timer 220, 222 refers to a digital counter driven by an oscillator. Embodiments of a timer 220, 222 are more fully described herein.

In at least one embodiment, each timer 220, 222 may reset based on a predetermined interval. Alternatively, each timer 220, 222 may reset whenever the corresponding comparator 226, 228 detects a zero current crossing.

In at least one embodiment, the predetermined value for each timer 220, 222 may define a maximum on time ($T_{MAX}$). After $T_{MAX}$ elapses for a timer 220, 222 (including, e.g., any latency in the timer 220, 222 or corresponding control circuitry 224), the corresponding diagonal may be forced off; the timers 220, 222 thereby may compensate for any delay in turn-off caused by the comparators 226, 228. For example, where the comparators 226, 228 cause a 20 ns delay in turn-off (actual turn-off occurring after the direction of the current actually switches), $T_{MAX}$ may define a length of time equal to an inherent cycle length of the comparator 226, 228 operating on the input waveform, minus 20 ns.

In at least one embodiment, $T_{MAX}$ may be determined by control circuitry 224 setting $T_{MAX}$ to some high value (for example, the duration of an entire waveform cycle), and then the control circuitry 224 may iteratively reduce $T_{MAX}$ until the timer 220, 222 or some other circuitry determines that the corresponding comparator 226, 228 still detects current. Such detection may indicate the current has not switched directions and that the system may be switching early. The value for $T_{MAX}$ arrived at iteratively may correspond to a value that sets FETs 200, 202, 204, 206 in a diagonal into the off state before the comparator 226, 228 detects that current through a FET 200, 202, 204, 206 in the diagonal has stopped; in the context of the present disclosure, current through a FET 200, 202, 204, 206 in the diagonal has stopped when the current of the input waveform switches direction (turns negative) or crosses over "zero" current, and the comparator 226, 228 of the alternate diagonal detects a positive current. The process for determining a value for $T_{MAX}$ is more fully described herein. The control circuitry 224 may be embodied in, e.g., a state machine, field programmable gate array, specialized hardware processor, general processor programmable by software or firmware, or other data processing architecture suitable for determining $T_{MAX}$ according to the process defined herein. Alternatively, the control circuitry 224 may iteratively increase $T_{MAX}$ until the timer 220, 222 or some other circuitry determines that the corresponding comparator 226, 228 detects a re-trigger signal or event as more fully described herein.

In at least one embodiment, the timers 220, 222 may be digital timers with discrete units of adjustment. In that case, the diagonals may be forced off one discrete unit early. Alternatively, the timers 220, 222 may comprise hybrid digital/analog timers as more fully described herein.

Some embodiments of the present disclosure may be noninvasive in that timers and corresponding control circuitry 224 only force FETs off, which may not interfere with the power scheme of the rectifier. It may be appreciated that a maximum turn-off time enforced by timers may also be possible.

Figure 3:
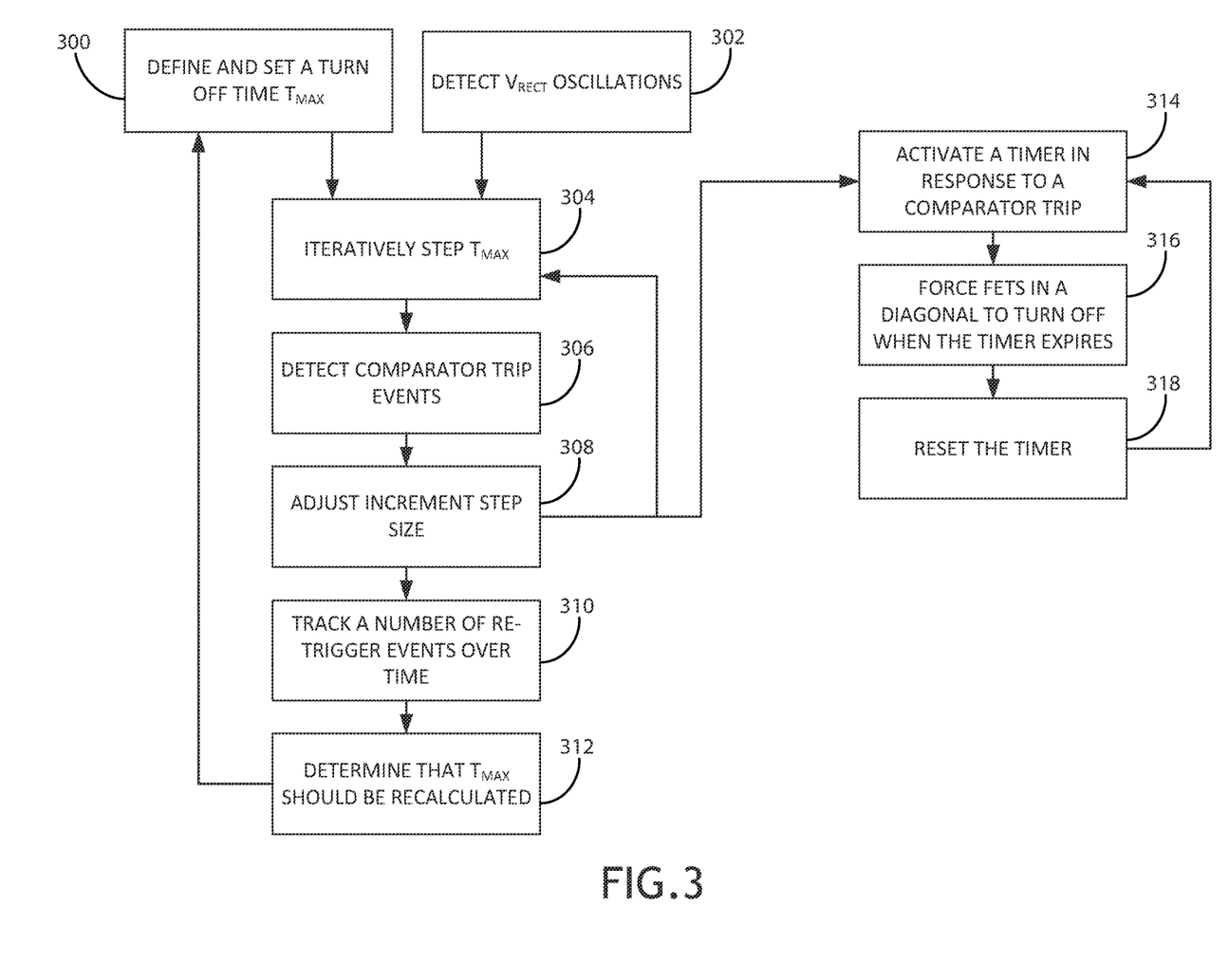
FIG. 3 shows a flowchart of a method for switching FETs in a rectifier circuit according to an exemplary embodiment.

Referring to FIG. 3, a flowchart of a method for switching FETs in a rectifier circuit according to an exemplary embodiment is shown. A rectifier, according to at least one embodiment, may include control circuitry that enters an initial phase at start up or whenever a reset event occurs; for example, when the control circuitry determines that rectifier output has become unstable.

During the initial phase, the control circuitry may define 300 a delay, $T_{MAX}$. $T_{MAX}$ may be set to an initial value. Generally, the initial value may be defined as greater than an anticipated switching cycle of the rectifier (the time for each diagonal of the rectifier to go through one complete on/off cycle; for example, an input waveform cycle), but may be defined as less than the anticipated switching cycle (or even 0 ns) if the control circuitry detects 302 certain $V_{RECT}$ oscillations.

The control circuitry may iteratively step 304 $T_{MAX}$ up or down by some increment (iteratively increases or iteratively reduces $T_{MAX}$). In at least one embodiment, the control circuitry may maintain $T_{MAX}$ at the incremented value for one or more switching cycles. The control circuitry may detect 306 comparator trips and may continue to increment $T_{MAX}$ until the control circuitry detects 306 a high side re-trigger event after $T_{MAX}$ expires.

In at least one embodiment, the control circuitry may vary 308 the increment in response to a number of incremental steps up or down. For example, where the control circuitry increments up or down more than one step consecutively, the control circuitry may increase the increment; likewise, when the control circuitry determines that the direction of increment should change from one iteration to the next (up to down, or down to up), the control circuitry may reset the increment to some minimum value.

After the initial phase, the control circuitry may enter an operational phase where the control circuitry tracks 310 a number of re-trigger events over time to determine 312 if $T_{MAX}$ should be adjusted, or if $T_{MAX}$ should be reset by re-entering the initial phase. In at least one embodiment, the control circuitry 310 may include, e.g., a lock detector to monitor and record the number of re-trigger events, and indicate when the number of re-trigger events falls below a threshold such as an average over time. In at least one embodiment, capturing counter times for each diagonal may allow the system to derive useful metrics on the AC1/AC2 signal. Such metrics may include, e.g., signal-to-noise ratio estimation, duty cycle estimation, fast carrier frequency estimation, instability, and the like.

During normal operation, a rectifier according to embodiments of the present disclosure may include timers configured to activate 314 whenever a corresponding comparator trips. When the timer expires 316, the rectifier may force FETs in a diagonal including a FET associated with the comparator to turn off. After a preset time, or in response to some event, the rectifier may reset 318 the timer for a subsequent switching cycle.

Figure 4:
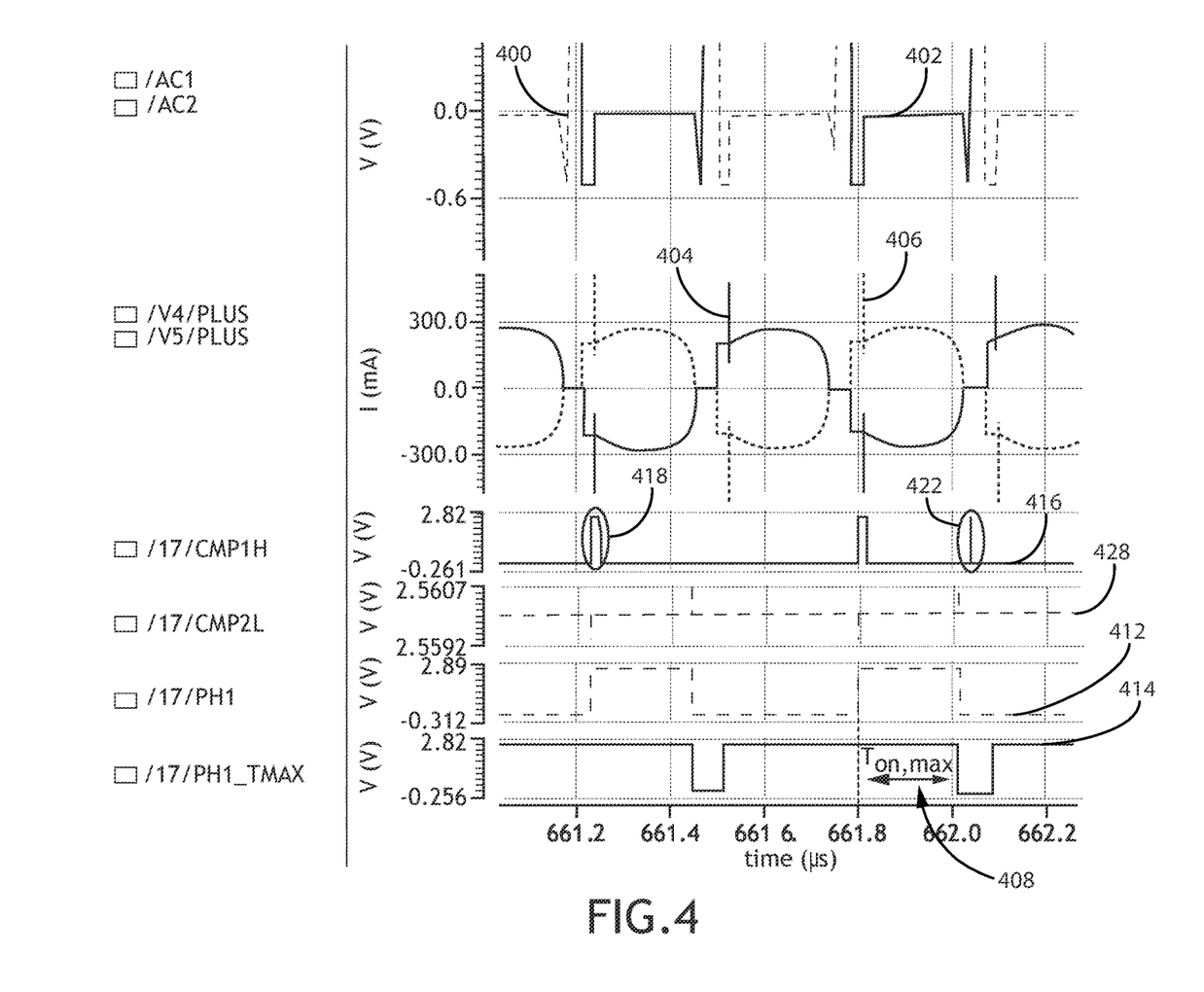
FIG. 4 shows graphs of rectifier output voltage, current, and switching signals.

Referring to FIG. 4, graphs of rectifier output voltage, current, and switching signals are shown. AC waveforms 400, 402 (zoomed to show a near ground segment) may be received by a rectifier. As the rectifier operates, coil currents 404, 406 may be produced. A first comparator (see FIG. 2, a first high side comparator 216) may produce a signal 416 including pulses 418 whenever the first comparator detects a positive current (i.e., the first comparator trips).

In at least one embodiment, the FETs may be turned on for a diagonal when a high side comparator of the diagonal produces a pulse 418; the pulse 418 also may start a timer 412. The duration of the timer ($T_{MAX}$ 408) may be defined to force the diagonal to turn off before the low side comparator 428 switches, and immediately produce a high side comparator re-trigger signal 422. Once properly calibrated, the low side comparator 428 may no longer switch because the FETs are already off by the time the low side comparator 428 detects the zero crossing.

During an initial phase, for example, during rectifier startup or reset, control circuitry adjusts $T_{MAX}$ 408 until the high side comparator produces the re-trigger signal 422, indicating that the diagonal was turned off early. In at least one embodiment, the control circuitry may start by defining $T_{MAX}$ 408 to some initial value known or determined to be greater than one cycle of the input waveforms 400, 402. During a lock phase, $T_{MAX}$ 408 may be stepped down quickly until one or more re-trigger signals 422 are detected.

After the initial phase, the control circuitry may adjust $T_{MAX}$ 408 based on the number of re-trigger signals 422 detected during some period, such as a programmed integrating period. In one exemplary embodiment, after the initial phase the control circuitry may increment $T_{MAX}$ 408 if the control circuitry detects more than, e.g., 20 re-trigger signals 422 per 100 field clocks, and decrement $T_{MAX}$ 408 if the control circuitry detects fewer than, e.g., 2 re-trigger signals 422 per 100 field clocks.

Figure 5:
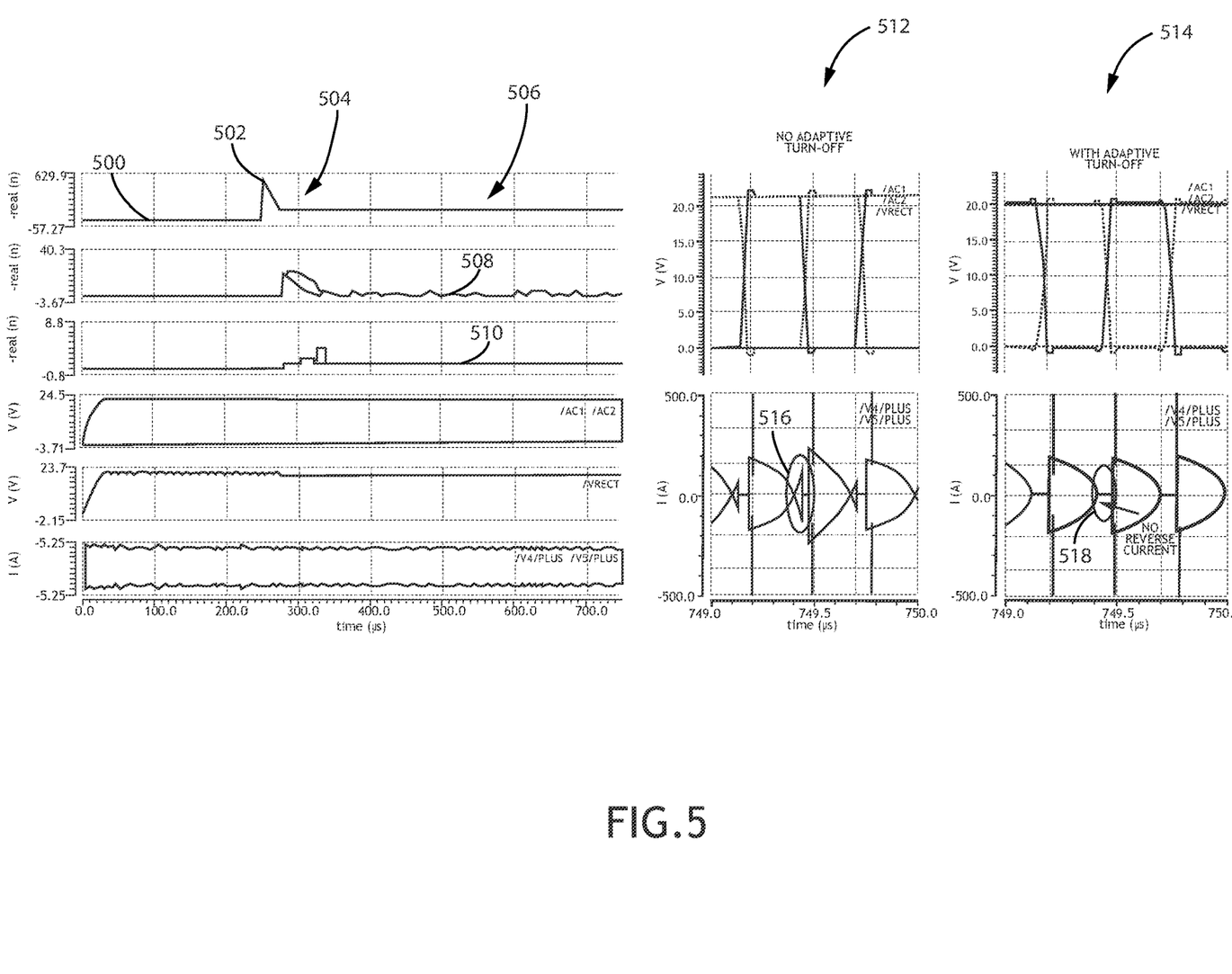
FIG. 5 shows graphs of rectifier output voltage and current according to an exemplary embodiment.

Referring to FIG. 5, graphs of rectifier output voltage and current according to an exemplary embodiment are shown. When timers for an exemplary rectifier are enabled, $T_{MAX}$ 500 may be set to some initial large value 502, then during the initial phase, $T_{MAX}$ 500 may be stepped down 504 based on re-trigger signals as more fully described herein. Control circuitry may step down $T_{MAX}$ 500 by singular discrete units, or according to some methodology such as a binary algorithm. After a value is identified for $T_{MAX}$ 500, the value may be maintained and/or updated via the control circuitry during an operational phase where $T_{MAX}$ 500 converges 506 toward an idealized value.

In at least one embodiment, the width 508 of the re-trigger signal may be a metric of how closely $T_{MAX}$ 500 corresponds to an ideal turn-off time. If the re-trigger signal is wide, then $T_{MAX}$ 500 may be too short, turning FETs off excessively early. Control circuitry may monitor re-trigger signal width 508 and adjust $T_{MAX}$ 500 to the narrowest re-trigger signal possible with the available timers. During the initial phase and operational phase, the re-trigger signal width 508 may converge toward some defined threshold, including the smallest non-zero value possible with the available timers. The re-trigger signal width 508 is shown as a graph of re-trigger signal width values for each rectifier switching event. For embodiments of the present disclosure, re-trigger signal width values may converge to some small, non-zero threshold.

It may be appreciated that embodiments of the present disclosure may enforce a maximum on time. A low side comparator may continue to turn off early if a drop in load trips the low side comparator. Likewise, where the load unexpectedly increases, that state may be reflected in a change in the re-trigger signal width 508. The convergence process would then adjust $T_{MAX}$ 500 accordingly.

It may be appreciated that $V_{RECT}$ may be unstable for certain switching times depending on characteristics of the system such as load; $V_{RECT}$ may be generally more stable as the load increases. Embodiments of the present disclosure may force adjustment of the switching time, in real time, to suppress $V_{RECT}$ instability.

In at least one embodiment, $T_{MAX}$ 500 may be adjusted incrementally, and increment values 510 may be dynamic. For example, increment values 510 during the initial phase may increase with each step down so that $T_{MAX}$ 500 may converge quickly. Alternatively, the control circuitry may identify two steps in the same direction (i.e., two consecutive steps to shorten or lengthen $T_{MAX}$ 500) and may increase the incremental value 510 in that direction. When a step in the opposite direction is identified, the incremental value 510 may be reduced to some defined minimum value such as a single discrete unit and the convergence process may continue such that $T_{MAX}$ 500 may be maintained near some idealized value.

Traditional graphs 512 of a rectifier's performance show input and output voltages, and corresponding coil currents. Such rectifiers produce reverse coil currents 516 caused by the delay turning of the FETs in a diagonal. By comparison, graphs 514 of a rectifier's performance according to an exemplary embodiment may show no reverse coil currents 518.

Figure 6:
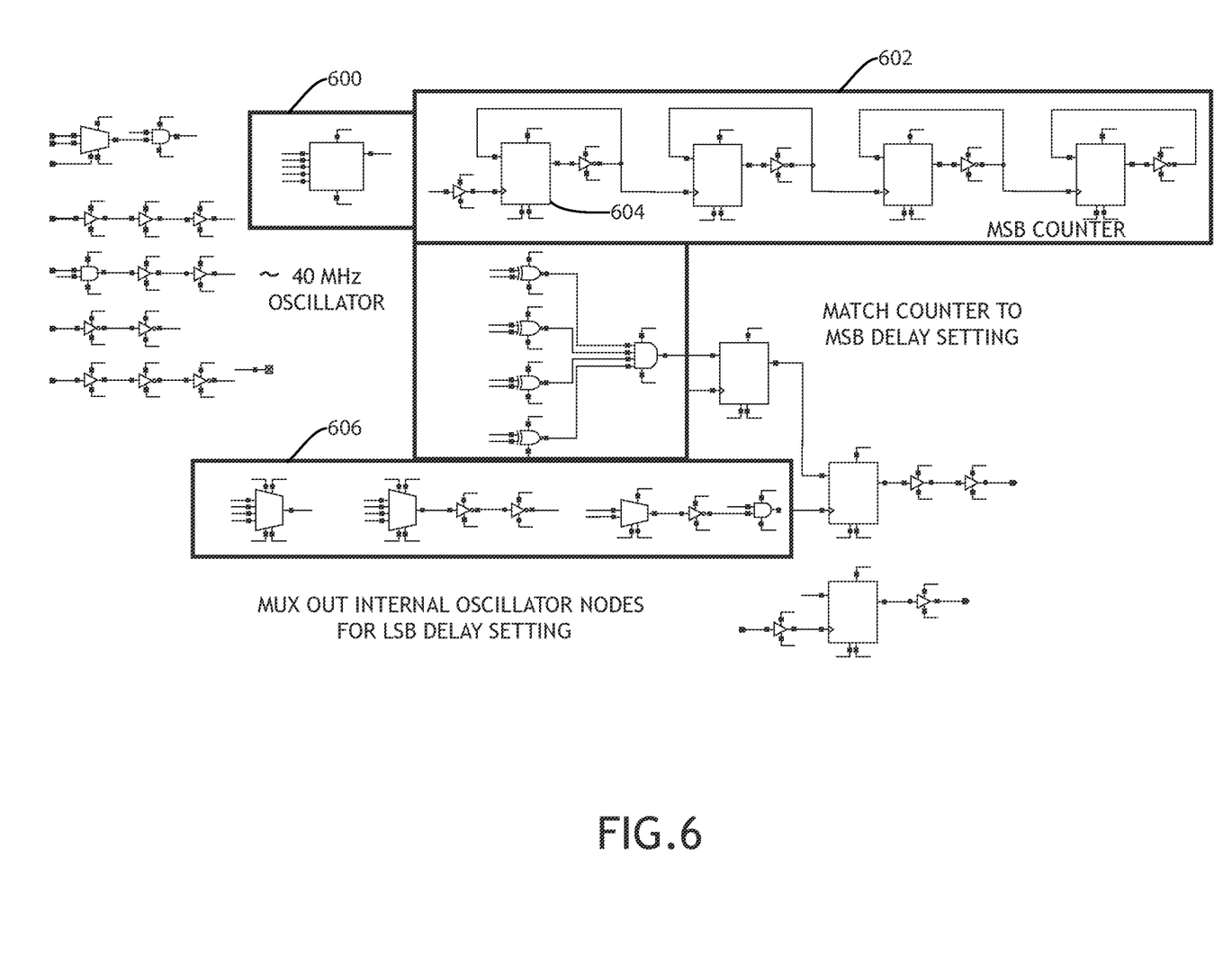
FIG. 6 shows a block diagram of a timer according to an exemplary embodiment.

Referring to FIG. 6, a block diagram of a timer according an exemplary embodiment is shown. Timers useful for implementing embodiments of the present disclosure may support a full range of operating frequencies, for example up to 20 μs, and should be capable of synchronization with the receiving field (i.e., asynchronous relative to the digital system clock). For any specific carrier frequency, the timer duration may approach the inverse of the carrier frequency ($1/F_{CARRIER}$). The digital system clock is usually more accurate, but a timer implementing embodiments of the present disclosure should be able to traverse the domain without trying to control it purely with the digital clock (e.g., an electronic oscillator, memory elements directly clocked by the oscillator signal, and combinatorial logic in communication with the output of those memory elements). Furthermore, the resolution of the timers may be in the range of about 1 ns; fine resolution may be desirable to produce a closely defined value for $T_{MAX}$.

In at least one embodiment, each timer comprises a combined analog and digital clock. The digital clock may reference, e.g., an external crystal or an external phase-locked loop (PLL) so the time base may be very precise. The digital clock may be the primary clock for tracking $T_{MAX}$. The analog clock may be responsible during initial rising and may be active until the digital clock is able to synchronize. The analog clock also bridges the gap between a last digital clock edge in each cycle, and the end of $T_{MAX}$. Such a timer would function as an analog resistor-capacitator (RC) based ring oscillator with transparent latches to define the state of the oscillator. Alternatively, the timer may comprise, e.g., a high speed PLL or a digital counter and an analog delay line.

When the digital clock synchronizes with a control signal, the oscillator may be paused in place. When the digital signal releases, the transparent latches may allow the oscillator to continue from its previous position. Embodiments of such a timer may allow the ring oscillator to interpolate the delay resolution down to the unit width of each unit elements such as delay elements in the ring oscillator.

In at least one embodiment, the timer includes a ring oscillator 600 and a coarse counter 602. In at least one embodiment, the ring oscillator 600 may operate at about 40 MHz, but other operating frequencies may be envisioned based on implementation. The coarse counter may include a plurality of most significant bit counters 604. The ring oscillator 600 may trip the coarse counter 602.

Furthermore, the individual internal nodes of the ring oscillator 600 may be multiplexed to the output. The combination of the coarse counter 602 and internal point in the oscillator may define the analog portion of the $T_{MAX}$ delay.

The digital clock may provide the bulk of $T_{MAX}$ timing; an analog oscillator may bridge the gap from a control signal rising edge to a synchronized version of the last digital clock edge to end of $T_{MAX}$. Analog oscillators are electronic systems the produce a periodic, oscillating electronic signal such as a sine wave, square wave, triangle wave, or the like. Analog oscillators may include, but are not limited to, RC oscillators, inductor-capacitor (LC) oscillators, crystal oscillators, and the like.

Where a wireless power device includes a rectifier according to at least one embodiment, control circuitry may enter a calibration phase at the beginning of each wireless power session (or upon request) in order to compute the size of the set of least significant bit counters 602 based on a number of digital clock cycles. In at least one embodiment, the control circuitry may split $T_{MAX}$ into the portion handled by the analog oscillator and the portion handled by the digital clock. For example, the timer may comprise 15 bits total, the most significant 9 bits defined by the digital clock, and the least significant 6 bits defined by the analog oscillator, but other allocations are envisioned. It may be advantageous for the number of analog oscillator bits to be at least two digital clocks greater than a worst-case synchronization error.

In one exemplary embodiment, $T_{MAX}$ may be computed by:

$T_{RESIDUE} = T_{MAX}$ Worst-case Synchronization Error for $T_{MAX}$ > Worst-case Synchronization Error, otherwise 0

$T_{DIGITAL}$ = Most Significant Bit($T_{RESIDUE}$)

$T_{ANALOG} = T_{MAX} - T_{DIGITAL}$ $T_{SET} = T_{ANALOG}$ * Least Significant Bits/64

During an initial phase, control circuitry counts the number of diode trigger events in an integration window. If the count is greater than a predefined value, $T_{MAX}$ may be increased by some amount. Alternatively, if the count is less than a predefined value, $T_{MAX}$ may be decreased by some amount. In at least one embodiment, the number of increases and decreases may be tracked. When there are a number of consecutive adjustments in the same direction, the size of the increment may be increased. Conversely, when the direction changes, the increment may be reset. After the initial phase, if the width of pulses is greater than a threshold for some number of consecutive cycles, the control circuitry may reenter the initial phase.

Figure 7:
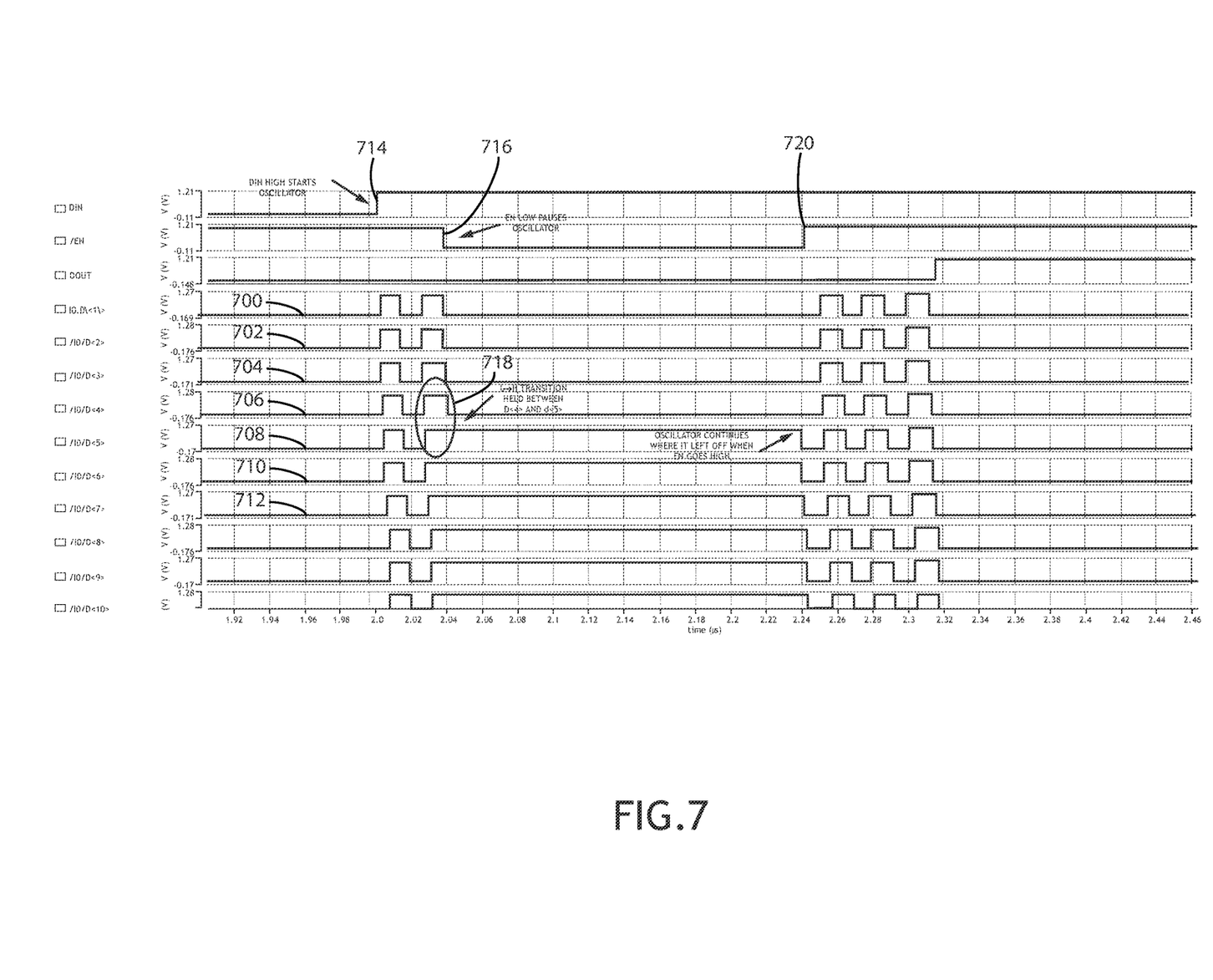
FIG. 7 shows graphs of voltage transitions according to an exemplary embodiment.

Referring to FIG. 7, graphs of voltage transitions according to an exemplary embodiment are shown. When a start signal 714 is received, the oscillator may begin producing intermediate signals 700, 702, 704, 706, 708, 710, 712, each having a staggered rising and falling edge with respect to the others. When an enable signal goes low 716, the state of the oscillator may be latched such that each intermediate signal 700, 702, 704, 706, 708, 710, 712 may be retained. In such a latched state, the low-to-high transition 718 may be locked and may be identified, for example between a fourth intermediate signal 706 and a fifth intermediate signal 708 delay element. When the enable signal goes high 720, the oscillator may continue from the point it was locked. $T_{MAX}$ may be defined by the delay of the analog oscillator plus the width of the pulse between the enable signal going low 716 and going high 720.

The analog oscillator may cover a range of about the four or five digital clock cycles, for example, about 100 ns relative to a 20 µs range. The analog oscillator may operate over a sufficient time range to encompass width of the pulse between the enable signal going low 716 and going high 720, plus enough extra to extend beyond the digital clock.

Figure 8:
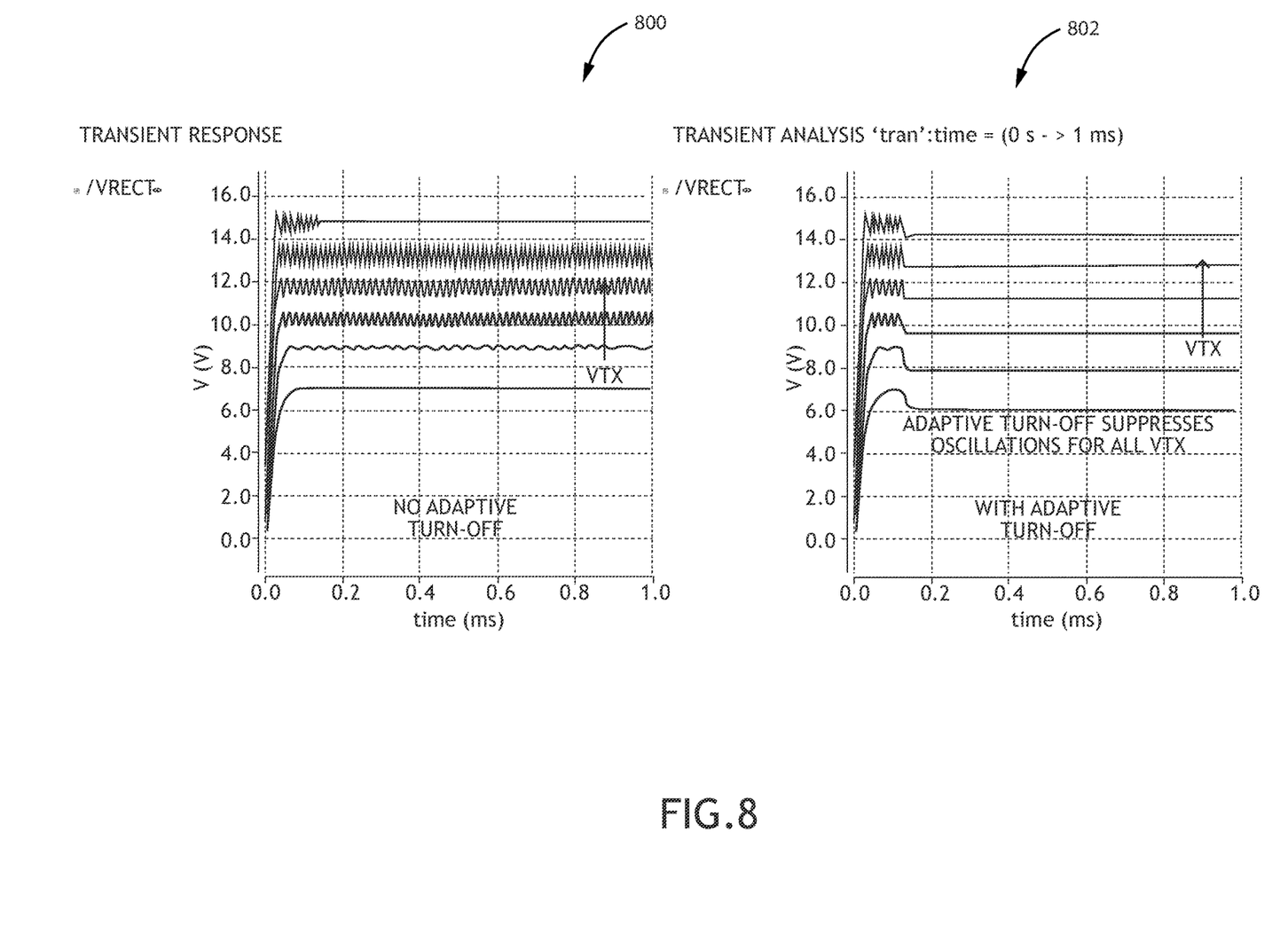
FIG. 8 shows graphs of transient response according to an exemplary embodiment.

Referring to FIG. 8, graphs of transient response according to an exemplary embodiment are shown. Reverse coil currents can cause oscillations in the $V_{RECT}$ as illustrated by traditional graphs 800 of such output voltages at increasing stepped up wireless power transmitter inverter supply voltages ($V_{TX}$); higher values of $V_{TX}$ correspond to higher values of $V_{RECT}$. Embodiments of the present disclosure may suppress such oscillations by preventing reverse currents at the coil as illustrated in exemplary graphs 802 where the $T_{MAX}$ time enforced turn-off is used. Furthermore, $T_{MAX}$ time enforced turn-off has demonstrated rectifier efficiency improvement at higher load currents.

Figure 9:
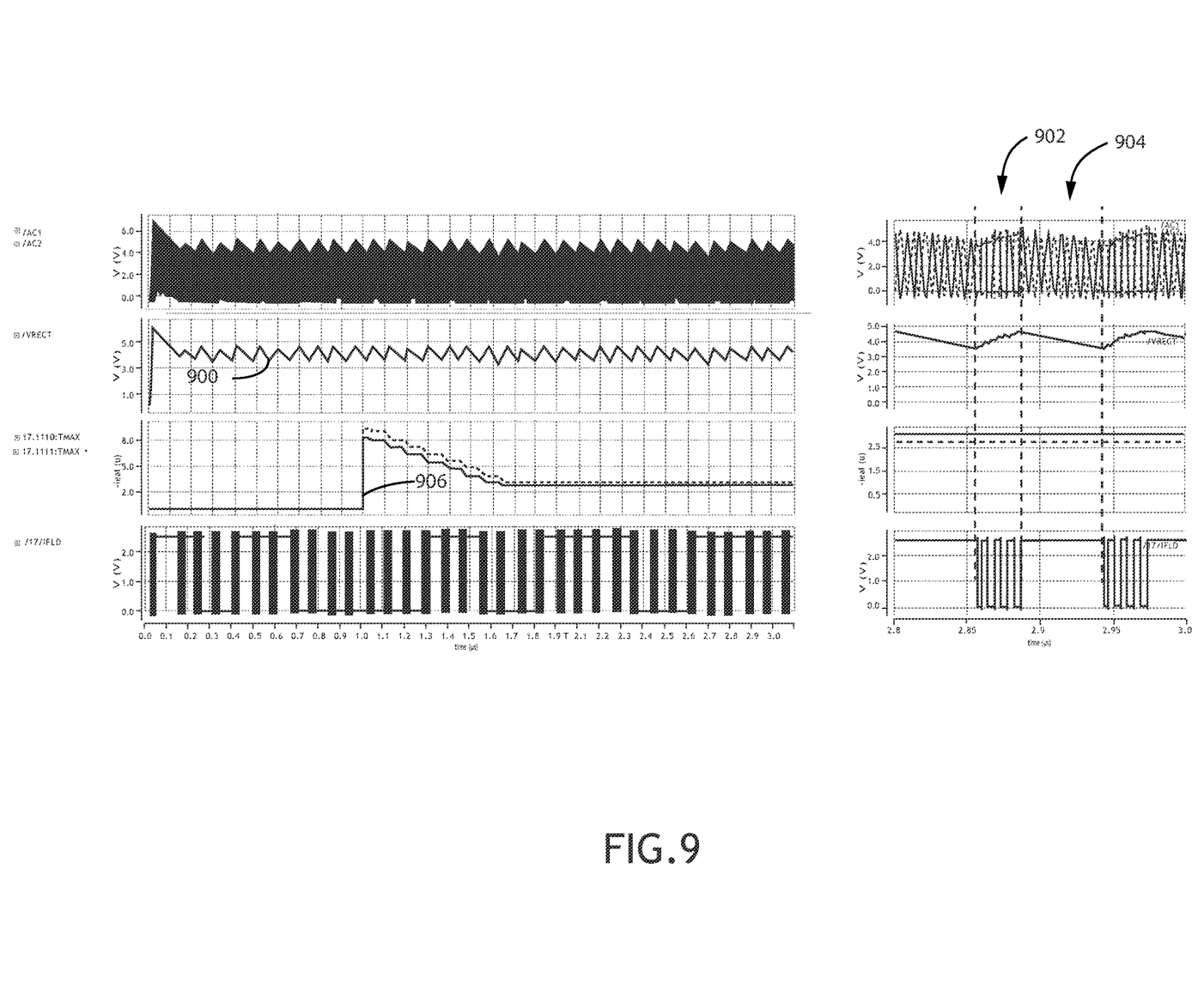
FIG. 9 shows graphs of rectifier output voltage oscillations during adaptation according to an exemplary embodiment.

Referring to FIG. 9, graphs of rectifier output voltage oscillations during adaptation according to an exemplary embodiment are shown. Certain transmitters utilizing a rectifier may produce a $V_{RECT}$ 900 having a non-sinusoidal, triangular waveform. This behavior is characteristic of a rectifier in a state where it conducts for very short bursts 902 followed by periods 904 of no switching where the rectifier coasts to a lower $V_{RECT}$ 900 value. Embodiments of the present disclosure where $T_{MAX}$ 906 may be determined by stepping down from a high initial value may produce a value for $T_{MAX}$ 906 that is appropriate for the periods of short bursts 902 where the rectifier is actually switching.

Figure 10:
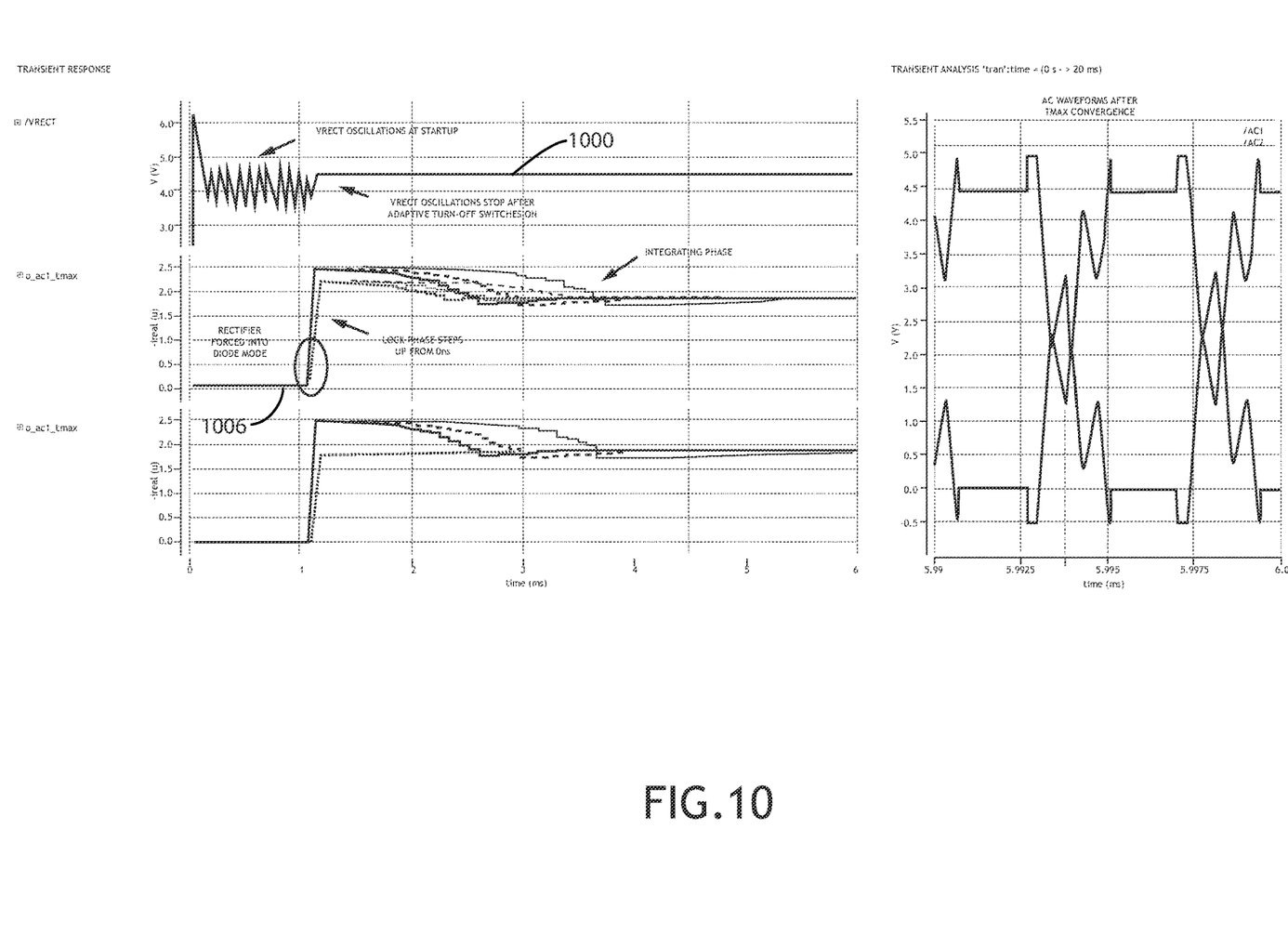
FIG. 10 shows graphs of voltage oscillations and convergence according to an exemplary embodiment.

Referring to FIG. 10, graphs voltage oscillations and convergence according to an exemplary embodiment are shown. In at least one embodiment, during the initial phase, the control circuitry may set a very small initial value for $T_{MAX}$ 1006, for example, 0 ns, to force the rectifier into diode rectification for a period of time. Forcing the rectifier into diode rectification stops any reverse coil currents and suppresses the oscillations of $V_{RECT}$ 1000. Once the oscillations are suppressed or reduced below a predefined threshold amplitude, frequency, or both, the control circuitry may step up $T_{MAX}$ 1006 in a convergence process as more fully described herein.

Figure 11:
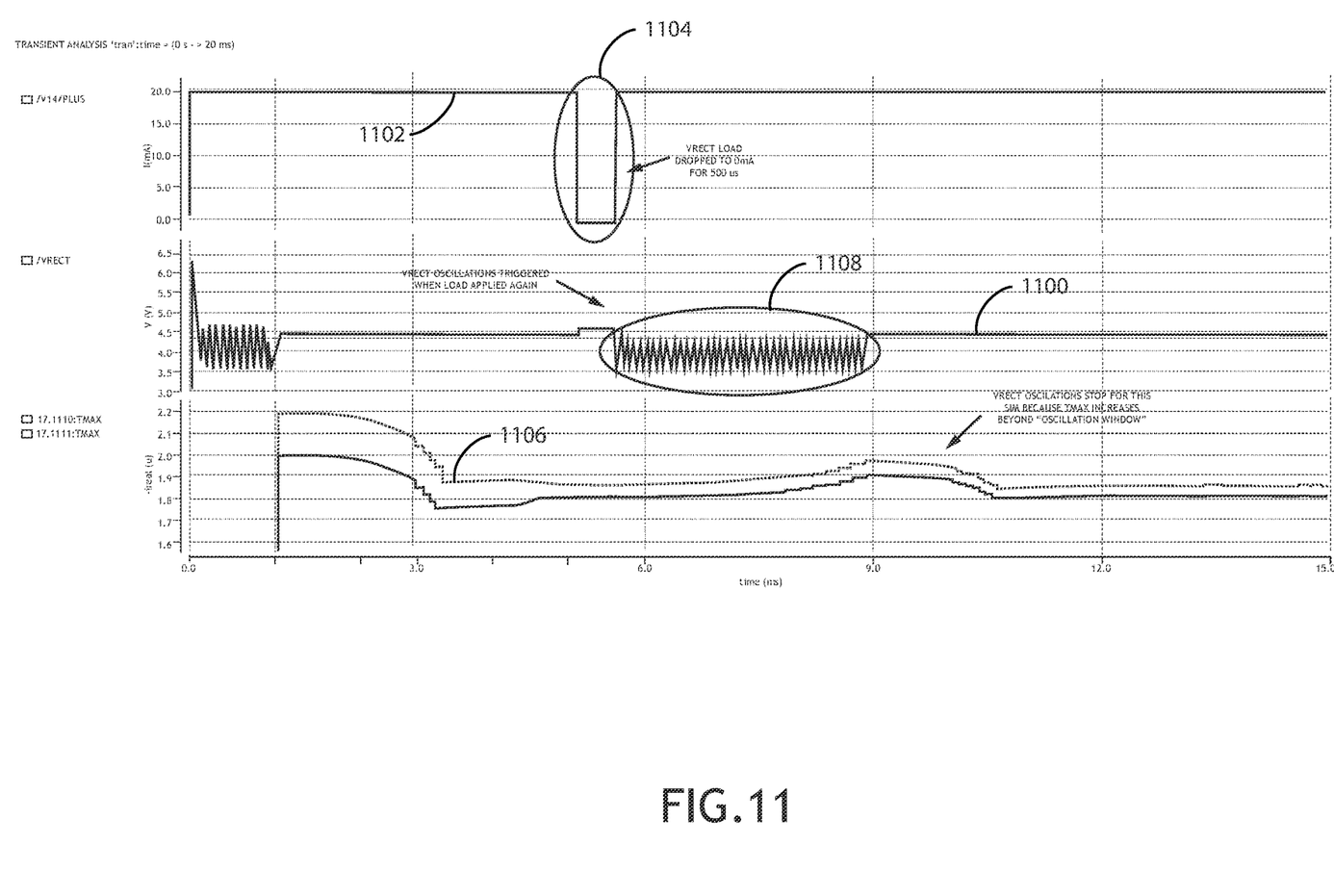
FIG. 11 shows graphs of rectifier output voltage oscillations according to an exemplary embodiment.

Referring to FIG. 11, graphs of rectifier output voltage oscillations according to an exemplary embodiment are shown. Where the load 1102 on a rectifier changes significantly, for example when the load drops 1104 in a load transient, $V_{RECT}$ 1100 may suffer instability 1108 when the load 1102 returns. In at least one embodiment, control circuitry may be configured to identify the instability 1108 and reconverge $T_{MAX}$ 1106. For example, the control circuitry may reset $T_{MAX}$ 1106 to a high value and step down according to the processes described herein. Alternatively, the control circuitry may reset $T_{MAX}$ 1106 to a low value, including 0 ns, and step up according to the processes described herein.

Embodiments of the present disclosure may enable a fast dynamic response to changes in load. The process may be non-invasive as FETs are only be forced off. Digital control enables flexibility and programmability. Increment/decrement time, integration period, and increment/decrement criteria may be easily adjusted. Embodiments may allow rectifiers to suppress oscillations triggered for certain $T_{MAX}$ and load values before targeting zero current turn-off.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A circuit comprising:
   a first field effect transistor (FET);
   a first comparator configured to detect a current through the first FET;
   a second FET;
   a second comparator configured to detect a current through the second FET;
   a timer configured to set the first FET and the second FET into an off state after a time $T_{MAX}$ elapses; and
   a control circuitry, wherein the control circuitry is configured to:
   set $T_{MAX}$ to a value greater than a switching cycle of a rectifier; and
   iteratively reduce the $T_{MAX}$ until a value is identified that sets the first FET and the second FET into the off state before the first comparator detects that current through the first FET has stopped.

2. The circuit of claim 1, the control circuitry is further configured to:
   identify the second FET current; and
   iteratively reduce $T_{MAX}$ until a value is identified that sets the first FET and the second FET into the off state after the second comparator detects current through the second FET.

3. The circuit of claim 1, wherein the control circuitry is further configured to identify re-trigger signals from the first comparator.

4. The circuit of claim 3, wherein the control circuitry is further configured to:
determine a width of each re-trigger signal; and
reset $T_{MAX}$ when the width of a re-trigger signal is outside a predefined bound.

5. The circuit of claim 1, wherein control circuitry is further configured to:
identify voltage oscillations in a rectifier output;
set $T_{MAX}$ to zero;
determine the voltage oscillations have fallen below a threshold; and
iteratively increase $T_{MAX}$ until a value is identified that sets the FETs into the off state before the first comparator determines current in the first FET has stopped.

6. The circuit of claim 1, wherein the timer comprises a digital clock and an analog oscillator.

7. A method for switching a rectifier comprising:
identifying a current via a comparator;
starting a timer;
causing a set of field effect transistors (FETs) to enter an off state when the timer expires;
determining a time $T_{MAX}$ for the timer by:
setting the $T_{MAX}$ to a value greater than a switching cycle of the rectifier; and
iteratively reducing $T_{MAX}$ until a value is identified that causes the FETs to enter the off state before the comparator determines the current flow has at least one of turned negative or stopped; and
reset the timer,
wherein the timer is configured to cause the FETs to enter the off state before the comparator determines a change in current flow.

8. The method of claim 7, wherein:
determining the $T_{MAX}$ further comprises identifying a current through a FET in the set of FETs via a second comparator; and
the timer is further configured to cause the FETs to enter the off state after the second comparator identifies the current through the FET.

9. The method of claim 8, further comprises identifying re-trigger signals from the comparator.

10. The method of claim 8, further comprising:
determining a width of each re-trigger signal; and
resetting $T_{MAX}$ when the width of a re-trigger signal is outside a predefined bound.

11. The method of claim 7, further comprising determining a time $T_{MAX}$ for the timer by:
identifying voltage oscillations in a rectifier output;
setting $T_{MAX}$ to zero;
determining the voltage oscillations have fallen below a threshold; and
iteratively increasing $T_{MAX}$ until a value is identified that causes the FETs to enter the off state before the comparator determines the current flow has at least one of turned negative or stopped.

12. A rectifier comprising:
a first field effect transistor (FET);
a first comparator configured to detect a current through the first FET;
a second FET;
a second comparator configured to detect a current through the second FET;
a timer configured to set the first FET and the second FET into an off state at some time $T_{MAX}$; and
control circuitry, wherein the control circuitry is configured to:
set the $T_{MAX}$ to a value greater than a switching cycle of the rectifier; and
iteratively reduce the $T_{MAX}$ until a value is identified that sets the first FET and the second FET into the off state before the first comparator detects current through the first FET has at least one of turned negative or stopped.

13. The rectifier of claim 12, the control circuitry is further configured to:
identify the second FET current; and
iteratively reduce $T_{MAX}$ until a value is identified that sets the first FET and the second FET into the off state after the second comparator detects current through the second FET.

14. The rectifier of claim 12, wherein the control circuitry is further configured to identify re-trigger signals from the first comparator.

15. The rectifier of claim 14, wherein the control circuitry is further configured to:
determine a width of each re-trigger signal; and
reset $T_{MAX}$ when the width of a re-trigger signal is outside a predefined bound.

16. The rectifier of claim 12, wherein control circuitry is further configured to:
identify voltage oscillations in a rectifier output;
set $T_{MAX}$ to zero;
determine the voltage oscillations have fallen below a threshold; and
iteratively increase $T_{MAX}$ until a value is identified that sets the FETs into the off state before the first comparator determines current in the first FET has at least one of turned negative or stopped.

17. The rectifier of claim 12, wherein the timer comprises a digital clock and an analog oscillator.

* * * * *